(12) United States Patent
Quade

(10) Patent No.: US 8,526,912 B2
(45) Date of Patent: Sep. 3, 2013

(54) METHOD AND SYSTEM FOR USER AUTHENTICATION BY MEANS OF A CELLULAR MOBILE RADIO NETWORK

(75) Inventor: Michael Quade, Meckenheim (DE)

(73) Assignee: Deutsche Telekom AG, Bonn (DE)

( * ) Notice: Subject to any disclaimer, the term of this patent is extended or adjusted under 35 U.S.C. 154(b) by 16 days.

(21) Appl. No.: 13/381,246

(22) PCT Filed: Sep. 8, 2010

(86) PCT No.: PCT/EP2010/005503
§ 371 (c)(1),
(2), (4) Date: Jan. 9, 2012

(87) PCT Pub. No.: WO2011/029581
PCT Pub. Date: Mar. 17, 2011

(65) Prior Publication Data
US 2012/0157052 A1 Jun. 21, 2012

(30) Foreign Application Priority Data
Sep. 8, 2009 (DE) .......................... 10 2009 040 477

(51) Int. Cl.
*H04M 1/66* (2006.01)

(52) U.S. Cl.
USPC ........ 455/410; 455/411; 455/435.1; 380/247; 726/15

(58) Field of Classification Search
USPC ......... 455/410, 411, 435.1; 726/15; 380/247
See application file for complete search history.

(56) References Cited

U.S. PATENT DOCUMENTS

| | | | |
|---|---|---|---|
| 5,535,278 A * | 7/1996 | Cahn et al. ..................... | 380/274 |
| 6,338,140 B1 * | 1/2002 | Owens et al. ................. | 713/168 |
| 7,157,718 B2 | 1/2007 | Gianchandani | |
| 7,941,144 B2 | 5/2011 | Nylander | |
| 2002/0108062 A1 | 8/2002 | Nakajima | |
| 2003/0022655 A1 * | 1/2003 | Bogat ........................... | 455/406 |
| 2005/0147062 A1 * | 7/2005 | Khouaja et al. ............... | 370/332 |
| 2007/0022447 A1 * | 1/2007 | Arseneau et al. .............. | 725/74 |

(Continued)

FOREIGN PATENT DOCUMENTS

EP 0848360 A 6/1998
EP 1424861 A 6/2004

*Primary Examiner* — Danh Le
(74) *Attorney, Agent, or Firm* — Andrew Wilford

(57) ABSTRACT

The invention relates to a method and system for authentication of a user (11) at an access device by means of a cellular mobile radio network (17). The access device gives access to a facility or a service different from the mobile radio network (17). The cellular mobile radio network (17) comprises a base station (12) defining a mobile radio cell (16) with a unique identifier. A mobile radio terminal (14) having a unique identifier books into the mobile radio network (17) via said base station (12), and the authentication is carried out by means of the identifier of the mobile radio cell (16) and the identifier of the mobile radio terminal (14). The base station (12) is arranged at the location of the access device so that the access device has its own mobile radio cell (16) serviced by the base station (12), this mobile radio cell (16) defining an authentication cell (16) of the mobile radio network (17). The mobile radio terminal (14) is caused to book into the mobile radio network (17) via said base station (12) of said authentication cell (16) for the purpose of authentication at the access device whereupon the identifiers are sent to an authentication entity (18) that checks whether the user (11) is permitted to get access at the access device. Access is granted or denied depending on the permission of the user (11).

17 Claims, 1 Drawing Sheet

(56) References Cited

U.S. PATENT DOCUMENTS

| | | | |
|---|---|---|---|
| 2008/0127320 A1* | 5/2008 | De Lutiis et al. | 726/9 |
| 2008/0155654 A1* | 6/2008 | Ross et al. | 726/2 |
| 2008/0318567 A1* | 12/2008 | Popovic et al. | 455/422.1 |
| 2011/0021181 A1 | 1/2011 | Weiner | |

* cited by examiner

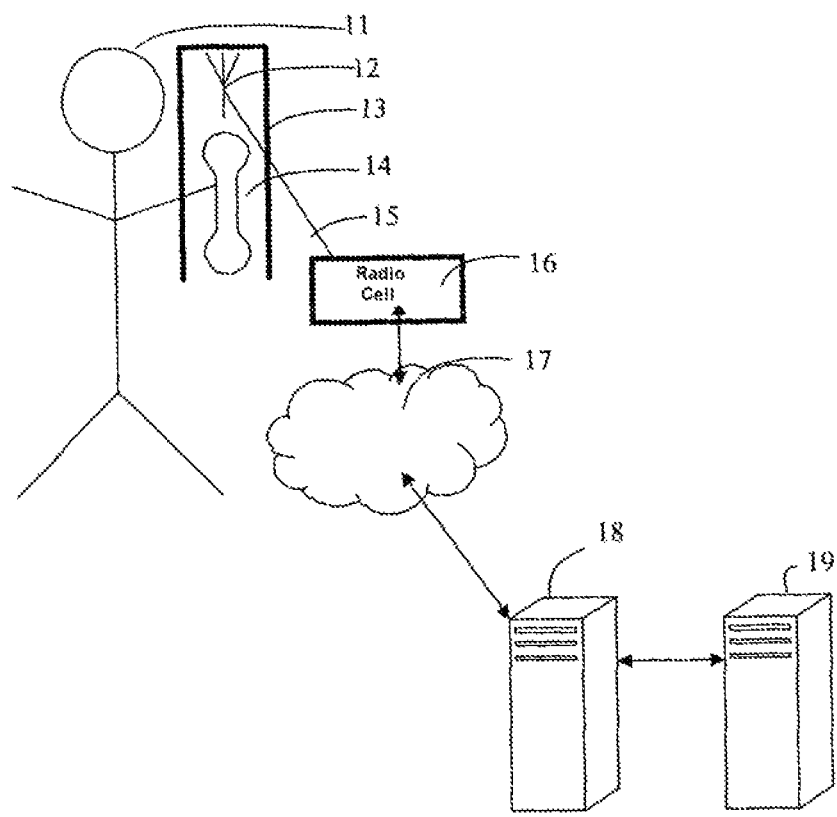

METHOD AND SYSTEM FOR USER AUTHENTICATION BY MEANS OF A CELLULAR MOBILE RADIO NETWORK

CROSS REFERENCE TO RELATED APPLICATIONS

This application is the US-national stage of PCT application PCT/EP2010/005503 filed 8 Sep. 2010, published 17 Mar. 2011 as WO2011/029581, and claiming the priority of German patent application 102009040477.5 itself filed 8 Sep. 2009, whose entire disclosures are herewith incorporated by reference.

The invention relates to a method and a system for authentication of a user at an access device by means of a cellular mobile radio network, wherein the access device gives access to a facility or a service different from the mobile radio network, the cellular mobile radio network comprising a base station defining a mobile radio cell with a unique identifier, a mobile radio terminal having a unique identifier books into the mobile radio network via said base station, and wherein the authentication is carried out by means of the identifier of the mobile radio cell and the identifier of the mobile radio terminal.

A method of this generic type is disclosed in EP 1 286 285 [US2002/0108062].

Currently, there are a lot of electronic authentication systems which are generally not compatible with each other. These systems include, e.g., electronically stored data on special data carriers such as, e.g. magnetic tape or card, chip card, storage media or other integrated circuits. Such systems can be combined with a secret such as a password or a PIN (Personal Identification number). Further well-known authentication systems use biometric information such as finger prints or and optical scanning of the iris.

The disadvantage here is that the variety of different authentication methods reduces the user acceptance and increases the costs. Moreover, security is not always ensured because, for example, a person identifying data can be read and copied to other cards.

The object of the invention is to provide a method and a system for authentication of a user at an access device which allows in a simple manner a reliable authentication in order to permit access to a certain facility or a service.

This object is solved according to the invention by an authentication method according to claim 1 and an authentication system according to claim 13. Advantageous developments of the invention are specified in the respective dependent claims.

According to the invention it is proposed a method for authentication of a user at an access device by means of a cellular mobile radio network, wherein the access device gives access to a facility or a service different from the mobile radio network, the cellular mobile radio network comprising a base station defining a mobile radio cell with a unique identifier, a mobile radio terminal having a unique identifier books into the mobile radio network via said base station, and wherein the authentication is carried out by means of the identifier of the mobile radio cell and the identifier of the mobile radio terminal, the base station being arranged at the location of the access device so that the access device has its own mobile radio cell serviced by the base station, this mobile radio cell defining an authentication cell of the mobile radio network, and that the mobile radio terminal is caused to book into the mobile radio network via said base station of said authentication cell for the purpose of authentication at the access device whereupon the identifiers are sent to an authentication entity that checks whether the user is permitted to get access at the access device, and that access is granted or denied depending on the permission of the user.

Furthermore, it is proposed a system for authentication of a user at an access device by means of a cellular mobile radio network, comprising an access device and a cellular mobile radio network, the access device giving access to a facility or a service different from the mobile radio network, the cellular mobile radio network comprising a base station defining a mobile radio cell with a unique identifier, the system further comprising a mobile radio terminal having a unique identifier and being able to book into the mobile radio network via said base station, the system being able to carry out the authentication by means of the identifier of the mobile radio cell and the identifier of the mobile radio terminal, wherein the base station is arranged at the location of the access device so that the access device has its own mobile radio cell serviced by the base station, this mobile radio cell defining an authentication cell of the mobile radio network, and that the system is arranged to cause the mobile radio terminal to book into the mobile radio network via said base station of said authentication cell for the purpose of authentication at the access device, the system further comprising an authentication entity for receiving the identifiers and checking whether the user is permitted to get access at the access device.

The basic idea of the invention is to provide an access device having its own mobile radio cell for the purpose of authentication a user. The mobile radio cell is formed by a base station arranged at the location of the access device so that the access device has its own mobile radio cell serviced by the base station. Any user having an ordinary mobile radio terminal, i.e. a cell phone, can be authenticated by booking into the mobile radio network via the base station over the mobile radio cell of the access device. Thus, this cell is called authentication cell within the scope of the invention.

Generally, the base station and the authentication cf.!1 provided by it need only to be used for authentication purposes. There is no need to provide telephone functionality. This means, that the base station is at least arranged in that it serves as access point of the mobile radio network, to receive a request of a mobile terminal to register in the mobile network and transmits an identifier of the mobile terminal and of the authentication cell to the network. However, the base station may have full telecommunication functionality so that a user booked into the network via the base station of the access device is able to receive calls, and that the user is able to continue a telephone call if a handover of the communication is performed from an ordinary macro cell of a cellular mobile radio network to the authentication cell.

According to one aspect of the invention a mobile radio terminal of a user is initially booked into a cellular mobile radio network via an ordinary macro cell. This mobile network may be the same or a different network as the network to which the base station of the access device is connected. The terms "same" and "different network" in this sense refer to the same or different network operators. Thus, the mobile network in which a user is initially registered may be operated by the same or another operator as the network to which the base station of the access device is connected. If a user is initially booked into a cellular mobile radio network via an ordinary macro cell of this network, a handover takes place into the authentication cell. The methods and steps generally known in the art referring to the handover from one cell into another cell of the same or a visited network may be applied for the handover to the authentication cell.

According to another aspect of the invention the mobile radio terminal of the user is not initially booked into a cellular mobile radio network. For authentication, the user may turn on his mobile radio terminal which immediately registers in the network via the base station of the access device, provided that it is located within the authentication cell.

The base station may be arranged in the immediate vicinity of or even within the access device. Thus, the authentication cell may cover an area, for example a room in which the access device is located. In an alternative embodiment the authentication cell covers spatially only a part of the access device or is formed in a small alcove provided in a room, in the access device or in a half-open housing separated from the access device. In contrast to an ordinary macro cell of a cellular radio mobile network which serves as access point to the mobile network for hundreds of users, the authentication cell is a pico-cell or femto-cell being spatially much smaller than an ordinary macro-cell of a cellular mobile radio network. This means that the authentication cell is spatially restricted to the location of the access device and at maximum covers the proximate environment of the access device. Preferably, it forms a part of the access device. A pico-cell which may cover a room or a femto-cell which may cover a part of the access device or an alcove is an access point to the mobile network only for several users or even for only one user at the same time. In a preferred embodiment, the authentication cell according to the invention only serves a single user as access point to the mobile network.

Preferably, the mobile radio terminal books into the mobile radio network immediately when it enters the geographic coverage area of the authentication cell. For example, if a user with a mobile telephone enters a room in which the authentication cell is established the telephone registers automatically via the base station of the access device. If the authentication cell is established in an alcove of the access device or in a partially open housing, the registration starts immediately when the telephone is laid in the alcove or in the case. The advantage of an immediate registration is that authenticating information, i.e. the identifier of the authentication cell and the identifier of the mobile radio terminal is already available on the network's side for authentication purpose when a user requests access at the access device. However, this embodiment needs the base station being active before a user requests access at the access device.

In a preferred embodiment, the base station is inactive as long as no access is requested at the access device. This is mostly the case at night. Therefore, according to the invention the base station is deactivated if there is no access requested at the access device for a predetermined period of time, for example, for five minutes. On the other hand, base station may be activated when a user requests access or immediately before he requests access. The latter may be realized by means of a motion sensor or infra-red sensor recognizing that a user approximates the access device. Alternatively, base station may be activated when a user activates the access device. Activation of the base station may be performed by the access device.

In an alternative embodiment, the mobile radio terminal may book into the mobile radio network only after an authentication process is initiated. This prevents that user's mobile telephone registers in the network in every case even if he requests access to a free facility or service. If needed for authentication the base station can broadcast a certain signal that causes the mobile telephone to register in the network for authentication.

According to the invention the authentication takes place by means of a unique identification of the mobile radio terminal and the identification of the authentication cell. The mobile radio terminal may be identified by the MSISDN (Mobile Subscriber Integrated Services Digital Network Number) IMSI (International Mobile Subscriber Identity) or IMEI (International Mobile Station Equipment Identity) or by the UICC (Universal Integrated Circuit Card) or SIM (Subscriber Identity Module) or USIM (Universal Subscriber Identity Module) being inserted into the mobile radio terminal. The method according to the invention thus allows a secure authentication by means of mobile radio terminal. The mobile radio terminal and the UICC, SIM or USIM do not have to include a special hardware or software. This means that every mobile radio terminal can be used for authentication according to the invention.

The term mobile radio terminal in the meaning of this invention is not restricted to a particular telecommunication standard or telecommunication technology. A mobile radio terminal, also known as mobile station (MS) or user equipment (UE), is the terminal in a mobile radio system, for example within a GSM network (Global System for Mobile Communications) or a UMTS network (Universal Mobile Telecommunication system). A mobile radio terminal consists substantially of the two units namely the mobile telephone and a data card like UICC, SIM or USIM.

A key aspect of the invention is that not only an ordinary registration of a mobile radio terminal takes place within the mobile radio network as this is known for the use of services of a mobile radio network, but that in addition to the registration at a certain location, the unique identification of the authentication cell is used for authentication purposes, i.e. that an authentication is only possible within said authentication cell of the cellular mobile radio network.

According to the invention, the user is identified by the identifier of the mobile terminal. Furthermore, the access device is identified by the identifier of the authentication cell because access device and base station, and authentication cell respectively, are assigned to each other. Therefore, the authentication process comprises the steps of identifying a user on the basis of the identifier of his mobile radio terminal, identifying the access device on the basis of the identifier of the authentication cell, and checking if the user is permitted to get access to a facility or a service at the specific access device. This permission may be stored in a database that can be accessed by the authentication entity. The database may be a part of the mobile radio network and be connected to the authentication entity. If permission exists access is authorized. The authorization may be performed by the authentication entity. This means that after permission of the user is checked a positive or negative feedback message is generated and submitted to the access device, in particular via the authentication cell.

For the purpose of authentication it is mandatory that the mobile radio terminal of the user registers in the mobile radio network via the base station of the device. According to the invention several measures are proposed to cause the mobile radio terminal to do that and to ensure that it does not register in any other network cell.

According to a first aspect of the invention the authentication cell is arranged within an electromagnetically encapsulated area. This means that the base station is surrounded by a shield that prevents outside electromagnetic radiation to enter the authentication cell or attenuates the same greatly so that no interference with the radio signals broadcasted by the base station occurs. Thus, in this shielded area, the mobile radio terminal can be held or laid for authentication. Hereby it is ensured that the mobile radio terminal registers into the authentication cell because the electromagnetic radiation of all other cells that would regularly be received within the authentication cell is suppressed. The shield can be made, e.g., from the following materials:

Metal sheet

Metal sheet with sufficiently small holes, i.e. smaller than the electromagnetic wavelength Glass with metal vapor coating Perspex with metal vapor coating or Other materials which absorb or reflect the respective electromagnetic radiation.

According to second aspect of the invention the base station broadcasts a special, in particular neutral mobile radio network operator identification. The term "special network operator identification" refers to an identification that is not uniquely assigned to a particular network provider but to more than one network operator. Furthermore, the term "neutral network operator identification" refers to an identification that does not refer to any particular network operator. The special network operator identification or neutral network operator identification enables the mobile radio terminal to book into the mobile network with which the base station of the authentication cell is connected although this network may not be the terminal's home network, may not be a preferred network or may even be blocked in the so-called preferred network list of the terminal.

This means that in this special embodiment, the authentication cell transmits a special operator identification which allows that not only the mobile radio terminals of the operator of the authentication cell can register into this cell to authenticate the users of the mobile radio terminal, but also mobile radio terminals of further mobile radio operators.

As the signal strength of the base station of the authentication cell at the location of the access device will be larger than the signal strength of every other surrounding macro cells of any network of the terminal it will book into the authentication cell and the mobile network associated therewith respectively.

According to a third aspect of the invention the base station broadcasts several mobile radio network operator identifications. This means that the authentication cell simultaneously or consecutively pretends to belong to several networks one of which is definitely a network listed as preferred network in the so-called preferred network list of the mobile radio terminal. As the signal strength of the base station of the authentication cell at the location of the access device will be larger than the signal strength of surrounding macro cells of the home network of the terminal it will book into the authentication cell and the mobile network associated therewith respectively.

Hereby it is ensured that registration of a mobile radio terminal located within the range of the base station of an authentication cell is only possible in the authentication cell but not in neighbor cells or in mobile radio cells of other networks which also cover this area.

In a preferred embodiment of the invention the mobile radio network operator identification broadcasted by the base station is the so called Mobile Network Code (MNC). According to the aforementioned second aspect of the invention a neutral mobile network code is transmitted by the base station of the authentication cell which is accepted by all network operators. In particular, the UICC, SIM or USIM of the respective network operators may, prior to use, be configured such that a preferred registering into a network is carried out upon reception of the neutral MNC used by the authentication cell. According to the aforementioned third aspect a plurality of MNC's is transmitted simultaneously by the authentication cell.

According to another embodiment of the invention several base stations are arranged at the location of the access device so that the access device has several own mobile radio cells serviced by each the base station, each mobile radio cell defining an authentication cell. In this embodiment each base station broadcasts a particular mobile network code of a particular network operator. This means that, at the location of the access device, different authentication cells are installed which transmit different MNCs. The authentication cells may belong to the same network operator or to different network operators, but can share certain infrastructure components or system components.

For authentication, a user to be authenticated has only to bring his mobile radio terminal into the serviced area of the authentication cell. The authentication cell can be set up similar to a pico cell or femto cell. After the mobile radio terminal is registered in said authentication cell, the identification of said mobile radio terminal, for example, on the basis of the IMSI, MSISDN, IMEI, UICC-ID or the like is checked in the authentication entity, and a positive or negative result is sent back to the authentication cell. Here, the authentication cell is recognized in the authentication entity based on its identification of the mobile radio operator and/or through further communication of the authentication center with the mobile radio network. Alternatively, the result can be submitted to other central or local components or the result of the authentication routine may be provided at an interface.

According to a further development of the invention, additional authentication methods can be used locally at the access device. These methods can be, among other things, passwords, PIN codes, biometric methods or data or further electronic authentication methods. Preferably, the user is requested to make a user input like a password or PIN code and/or to provide identification data, in particular biometric data. After a user input and/or identification data is received for authentication, in addition, a verification of the user input and/or identification data is carried out. These methods can be carried out with the authentication entity or other devices within the authentication cell, i.e. at the local position of the access device. Preferably, the user input and/or identification data is contactlessly transmitted to the access device or another device, in particular by means of RFID (Radio Frequency Identification).

Preferably, the system for authentication further comprises a receiving device for receiving a user input, and/or for recording identification data, in particular, biometric data of a user. The receiving device may be arranged to contactlessly transmit the user input and/or the identification data to the access device or another device for additional authentication, in particular by means of RFID.

The additional authentication methods increase the security of the authentication. For example, an authentication with a stolen mobile radio terminal can not be carried out successfully without fulfilling a further condition of an authentication method provided as additional security, for example without providing a PIN code.

Upon successful authentication, i.e. after the authentication has been carried out, an acoustic or optical signal can be output to the user.

According to the invention, the access device is integral part of an automatic teller machine, an admission control at an entrance or a door, a safety gate, a vehicle, a computer system, an application on a computer, or a government agency. In case of a positive performed authentication approves the access to a an automatic teller machine, a door, a room, a safety gate, a vehicle, a terminal, computer system, an application on a computer, or a government agency, or services of a government agency. An automatic teller machine is to be understood here in particular as a cash terminal or banking terminal in the broadest sense, i.e. in particular to withdraw cash or to arrange or confirm bank transfers. The authentication system according to the invention and the authentication method according to the invention can thus be used for any security devices, access controls, etc.

The base station of the authentication cell is preferably connected to the mobile radio network via a cable connection, and/or as repeater, and/or via radio communication. A cable connection can in particular be formed via a copper cable and/or fiber glass cable. Thus, the authentication cell is integrated in the mobile radio network like an ordinary cell of the mobile radio network so as to be able to utilize the resources and the mobile radio infrastructure.

Repeaters in telecommunication networks are predominantly designated as regenerators and serve there—as in almost all other networks—for signal amplifying and increasing the distance of data transmission. In mobile telecommunications, so-called repeaters are used as relay stations for "illumination" of shaded areas, e.g. buildings or the like.

Thus, there is a plurality of possibilities how the authentication cell can be connected to the mobile radio infrastructure.

In a first embodiment, the authentication cell is connected to the mobile radio infrastructure of the network by means of one or more physical telecommunication lines. These lines can be e.g. DSL (Digital Subscriber Line), ATM (Asynchronous Transfer Mode), VDSL (Very High Speed Digital Subscriber Line) or optical lines. In the simplest configuration, a connection is selected which has to support only the so-called signaling system #7 protocol because the same is used in several mobile radio networks for authentication purposes. For this, only a connection with a very narrow bandwidth is necessary.

In another embodiment, the connection takes place as repeater which serves as amplifier for enlarging a mobile radio cell. Here, the amplifier antenna would be used for authentication and would preferably be shielded as described above. However, the repeater would need to perform a further communication with the authentication entity because it does not have its own cell identification.

In another embodiment, the authentication cell is connected through a radio technology or via a direct optical transmission.

In a preferred embodiment, the authentication entity is an integral part of the mobile radio network, i.e., it is implemented in the network or coupled with the mobile radio network to perform the authentication. The authentication entity may be a central authentication server which is part of the mobile radio network. Alternatively the authentication entity may consist of a first server arranged to identify the user and the access device on the basis of the identifier of the user's mobile radio terminal and the identifier of the authentication cell, and a second server arranged to check the user's permission to get access at the specific access device. The first server may be part of the mobile radio network and the second server may be an external server, which is in particular part of the network of the operator of the access device.

According to the invention it is furthermore provided an access device giving access to a facility or a service different from the mobile radio network and having its own base station defining a mobile radio cell of a cellular mobile radio network with a unique identifier, the access device being arranged to carry out the method for authentication of a user as described above.

An exemplary embodiment of the invention is illustrated in the FIGURE and is explained hereinafter.

FIG. 1 shows a schema of the authentication in a mobile radio network by means of an authentication cell.

For authentication of the user 11 at an access device which is not shown in the FIGURE, he brings his mobile radio terminal 14 within the range of the base station 12 of an authentication cell 16. The base station 12 is symbolized by an antenna. The base station 12 has a shielding 13 so that electromagnetic radiation of other base stations of cells is suppressed and registering the mobile radio terminal 14 into the authentication cell 16 is possible only in the shielded area, i.e., when the mobile radio terminal 14 is placed within the shielding 13 around the antenna 12.

The shielding 13 thus forms an electromagnetically encapsulated area or room which prevents that the mobile radio terminal 14 accidentally registers at this location into another mobile radio cell which, with respect to its range, would also provide network coverage at this location.

The authentication cell 16 is coupled with the cellular mobile radio network 17, i.e. is connected to the entire mobile radio infrastructure 17.

Further, an authentication entity 18, 19 consists of two servers, a first central server 18 which is coupled with the mobile radio network 17 and a second, external server 19. A unique identifier of the mobile radio terminal 14 is submitted to the first server 18 as well as the identifier of the authentication cell 16.

Based on these two parameters, i.e. based on the two identifiers of the mobile radio terminal 14 and the authentication cell 16, the first server 18 of the authentication entity 18 identifies the user and the access device and performs the authentication process by accessing the second server 19 of the authentication entity. The authentication server 19 performs the verification of the permission of the user to access the access device and generates a corresponding feedback which is sent back via the first server 18 and the mobile radio infrastructure 17 to the authentication cell 16 and/or to the access device.

Upon a successful authentication of the user 11, the access for the user is approved. The authentication thus is based on the evaluation of a unique key of the mobile radio terminal 14 and the unique identification of the authentication cell 16. Due to the shielding 13 around the antenna 12, the coverage range of the authentication cell 16 is limited to a small area in order that an authentication and thus an access approval takes place only if the user is located in the area of the access to be approved to a building, an automatic teller machine, or certain services or the like, or if the user brings the mobile radio terminal into the area provided for authentication within the shielding 13.

The invention claimed is:

1. A method for authentication of a user at an access device by means of a cellular mobile radio network comprising a base station defining a mobile radio cell with a unique identifier, the method comprising the steps of:
   giving access via an access device to a facility or a service different from the mobile radio network
   booking a mobile radio terminal having a unique identifier into the mobile radio network via said base station,
   carrying out an authentication by means of the identifier of the mobile radio cell and the identifier of the mobile radio terminal,
   providing the base station at the location of the access device so that the access device has its own mobile radio cell serviced by the base station, defining with this mobile radio cell an authentication cell of the mobile radio network, booking the mobile radio terminal into the mobile radio network via said base station of said authentication cell for the purpose of authentication at the access device and then sending the identifiers to an authentication entity that checks whether the user is permitted to access at the access device, granting or denying access depending on the permission of the user, requesting the user to make a user input or provide identification data that are contactlessly transmitted to the access or another device, and for authentication verifying the user input or identification data.

2. The method according to claim 1, wherein the mobile radio terminal books into the mobile radio network immediately when it enters the geographic coverage area of the authentication cell.

3. The method according to claim 1, wherein the mobile radio terminal books into the mobile radio network after an authentication process is initiated and the base station broadcasts a certain signal for authentication.

4. The method according to claim 1, wherein the base station is activated after an authentication process is initiated.

5. The method according to claim 1, wherein the user is identified by the identifier of the mobile terminal and the access device is identified by the identifier of the authentication cell on the basis of its assignment to each other.

6. The method according to claim 1, wherein after permission of the user is checked a positive or negative feedback message is generated and submitted to the access device, in particular via the authentication cell.

7. The method according to claim 1, wherein the user input or identification data is contactlessly transmitted to the access device or another device, in particular by means of RFID.

8. The method according to claim 1, wherein a positive performed authentication approves the access to an automatic teller machine, a door, a room, a safety gate, a vehicle, a terminal, computer system, an application on a computer, or a government agency, or services of a government agency.

9. The method according to claim 1, wherein the base station broadcasts a special neutral mobile radio network operator identification.

10. The method according to claim 9, wherein the base station broadcasts several of the mobile radio network operator identifications.

11. An access device giving access to a facility or a service different from the mobile radio network the device comprising its own base station defining a mobile radio cell of a cellular mobile radio network with a unique identifier, the access device being arranged to carry out the method for authentication of a user according to claim 1.

12. A system for authentication of a user at an access device by means of a cellular mobile radio network, comprising an access device and a cellular mobile radio network, the access device giving access to a facility or a service different from the mobile radio network, the cellular mobile radio network comprising a base station defining a mobile radio cell with a unique identifier, the system further comprising a mobile radio terminal having a unique identifier and being able to book into the mobile radio network via said base station, the system being able to carry out the authentication by means of the identifier of the mobile radio cell and the identifier of the mobile radio terminal, wherein the base station is arranged at the location of the access device so that the access device has its own mobile radio cell serviced by the base station, this mobile radio cell defining an authentication cell of the mobile radio network, and that the system is arranged to cause the mobile radio terminal to book into the mobile radio network via said base station of said authentication cell for the purpose of authentication at the access device, the system further comprising an authentication entity for receiving the identifiers and checking whether the user is permitted to get access at the access device and a receiving device for receiving a user input or for recording identification data of a user, the receiving device serving to contactlessly transmit the user input or the identification data to the access device or another device for further authentication.

13. The system according to claim 12, wherein the base station of the authentication cell is arranged within an electromagnetically encapsulated area.

14. The system according to claim 12, wherein the authentication cell is a pico-cell or femto-cell being spatially much smaller than an ordinary macro-cell of a cellular mobile radio network.

15. The system according to claim 12, wherein the base station of the authentication cell is connected to the mobile radio network via a cable connection or as repeater or via radio communication.

16. The system according to claim 12, wherein the identification data are biometric data of the user, the receiving device being arranged to transmit the user input or the identification data to the access device or to the other device by means of RFID.

17. The System according to claim 12, wherein the access device is integral part of an automatic teller machine, an admission control at an entrance or a door, a safety gate, a vehicle, a computer system, an application on a computer, or a government agency.

* * * * *